United States Patent [19]
Sans

[11] Patent Number: 5,976,314
[45] Date of Patent: Nov. 2, 1999

[54] DEVICE FOR ULTRASONIC TREATMENT OF WORKPIECES BACKGROUND OF THE INVENTION

[75] Inventor: Manfred Sans, Albstadt, Germany

[73] Assignee: Maschinenfabrik Spaichingen GmbH, Spaichingen, Germany

[21] Appl. No.: 09/124,630

[22] Filed: Jul. 29, 1998

[30] Foreign Application Priority Data

Jul. 29, 1997 [DE] Germany .................... 297 13 448

[51] Int. Cl.$^6$ .................... B23K 20/10; B32B 31/00; B32B 31/16
[52] U.S. Cl. .................. 156/580.1; 156/73.1; 425/174.2; 228/1.1; 228/45
[58] Field of Search .................. 156/73.1, 73.2, 156/73.3, 73.4, 580.1, 580.2; 228/1.1, 110.1, 111, 111.5, 45; 264/442; 425/174.2

[56] References Cited

U.S. PATENT DOCUMENTS

| | | | |
|---|---|---|---|
| 3,029,766 | 4/1962 | Jones | 8/33 |
| 3,053,125 | 9/1962 | Kleesattel etal. | 228/1.1 |
| 3,562,041 | 2/1971 | Robertson | 156/73.1 |
| 3,780,926 | 12/1973 | Davis | 228/1.1 |
| 3,948,705 | 4/1976 | Ausnit | 156/73.4 |
| 5,565,119 | 10/1996 | Behun et al. | 219/121.63 |
| 5,791,549 | 8/1998 | Ito | 228/1.1 |

FOREIGN PATENT DOCUMENTS

| | | |
|---|---|---|
| 31 43 461 A1 | 8/1982 | Germany . |
| 42 06 584 C2 | 3/1994 | Germany . |
| 44 39 470 C1 | 5/1996 | Germany . |

*Primary Examiner*—Samuel M. Heinrich
*Attorney, Agent, or Firm*—Michael J. Striker

[57] ABSTRACT

A device for ultrasonic treatment of a workpiece which at least two treatment spots has at least two resonant units which are adapted to be associated with corresponding ones of said treatment spots, each of the resonant units having a convertor and a sonotrode connected with the convertor, a joint mounting body arranged so that the resonant units are mounted on the joint mounting body in an arrangement which is dependent on a position of the treatment spots on the workpiece, and a displacement unit which is common for the resonant units and is coupled with the mounting body.

12 Claims, 6 Drawing Sheets

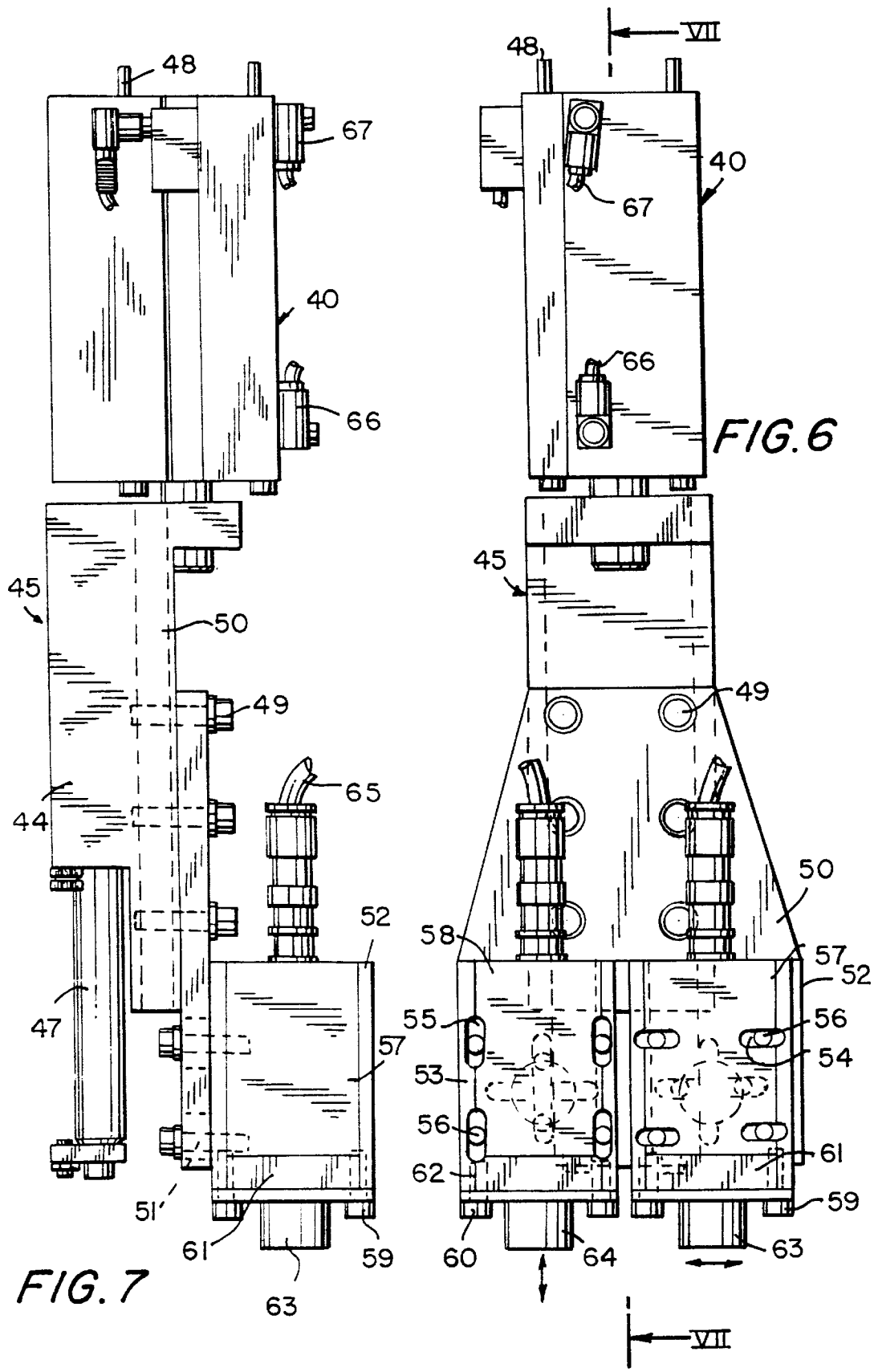

ND,314

DEVICE FOR ULTRASONIC TREATMENT OF WORKPIECES BACKGROUND OF THE INVENTION

BACKGROUND OF THE INVENTION

The present invention relates to a device for ultrasonic treatment of workpieces.

Devices of this type are used for connection of two components by welding or riveting with the use of ultrasound. They also can be used for other purposes, for example for cutting and the like. The treatment is performed so that an electrode which is identified as a sonotrode is subjected to mechanical vibrations by a converter which converts electrical energy into mechanical energy, and is pressed in the region of a preselected treatment point against the workpiece so as to plasticize the workpiece over a short time by heating. Such methods are utilized nowadays in many areas, for example in automobile industry and used there in particular for production of shock absorbers, door and trunk space coatings, instrument panels, consoles and the like of polypropylene and other thermoplastic materials.

In the known devices of this type, for example as disclosed in the German patent document DE 42 06 584 C2, each resonant unit (or vibration structure) which is composed of a converter, a sonotrode and in some cases a booster (or amplitude transformer) cooperating within them, are mounted on an associated displacement unit. The displacement unit is composed of a controllable, hydraulic or pneumatic cylinder/piston unit and displaces the resonant unit in direction of the workpiece to be treated. The sonotrode, depending on the position and construction of the treatment spots, can be composed of a one-piece vibration body or of a carrier body with at least one daughter horn (screw-in pin). The vibration body or the daughter horn is provided as a rule with a working or welding surface extending perpendicular to the direction of displacement. Thereby, for example in the case of a welding or riveting, it is guaranteed that the welding or riveting dome which is formed on the workpiece and applied on one of the two components to be connected can extend through corresponding openings of the other component. It can be for example 10 mm high and 1–3 mm wide, it can be loaded exactly in its axial direction, and therefore with conventionally utilized pressing forces of for example 200 N during the softening it does not move back or curve laterally.

The German reference DE 44 39 470 C1 discloses further arrangements of the above mentioned type in which the sonotrodes are connected with at least two converters. This guarantees that the sonotrodes with large treatnent surfaces are driven uniformly into vibrations over their full expansion.

During the utilization of known arrangements of the above mentioned types, the existing problems are, not resolved satisfactorily always when the workpiece has a plurality of treatment spots, for example in form of welding or riveting spots, which are located at different heights, in particular when they are located closely near one another and the distances between then are for example less than 50 mm. Since the whole resonant unit must be determined always within narrow limits of a preselected resonance frequency of for example 35 kHz, the sonotrode must have throughout substantially the same height corresponding to an integral multiplicity of the half wave length. With the use of several daughter horns per sonotrode, the pins must also have substantially the same length. This practically excludes the simultaneous treatment of treatment spots located at different height levels with the same sonotrode, since the daughter horns or sonotrode surfaces which deviate from one another in direction of the height by only several millimeters or have other asymmetricities can lead to fast distortion of a corresponding converter.

Known optimization methods for the sonotrodes, such as disclosed for example in the German patent document DE 31 43 461 A1, help this problem only conditionally. As a result, a special resonant unit which is adapted for each treatment welding location is needed, or the closely adjacent treatment pots must be treated frequently in several, successive cycles, since they are not simultaneously accessible with the available sonotrodes, in particular when the treatment direction must extend parallel to the axial direction of the riveting dome or the like. This increases the treatment times and requires a high expense for the holding of a plurality of different sonotrodes.

SUMMARY OF THE INVENTION

Accordingly, it is an object of present invention to provide a device for ultrasonic treatment of workpieces, which avoids the disadvantages of prior art.

A further object of the invention is to provide a device for ultrasonic treatment of workpieces, which is suitable for the treatment of spots located at different height levels of a workpiece.

Yet another object is to design the device for ultrasonic treatment of workpieces such that also work pieces can be treated, the treatment spots of which are located relatively close to one another.

In keeping with these objects and with others which will become apparent hereinafter, one feature of present invention resides, briefly stated, in a device for ultrasonic treatment of a workpiece which has at least two treatment spots with the use of at least two resonant units, in which the resonant units are mounted on a joint mounting body in an arrangement which is dependent on the position of the treatment spots on the workpiece, and the displacement device is composed of a displacement unit which is a displacement unit common for all resonant units and is coupled with the mounting body.

The inventive device is based on the feature that for predetermined treatment objectives, a mounting body with a plurality of resonant units is provided, and the resonant units are arranged on the mounting body in a manner which is specific for the corresponding workpiece. Thereby, sometimes it is required to increase the number of the resonant units which are needed for the treatment of a workpiece. A substantial advantage of the invention is, however, that the resonant units can be substantially simplified, the mounting body can be provided often with several resonant units of identical design, and thereby significant improvements are achieved in mounting, service, storage, and modifications.

These advantages are especially pronounced when, in accordance with a preferable embodiment of the invention, the device has means for adjusting the relative position of the resonant unit on the mounting body. In this case, a simple adaptation of the device for the position of the different treatment spots of a workpiece is possible.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 6–8 show a rear view, a side view and a cross-section along the line VIII—VIII in FIG. 6 for an embodiment of the inventive device with all details which are necessary for understanding of the present invention.

DESCRIPTION OF PREFERRED EMBODIMENTS

Figure 1:
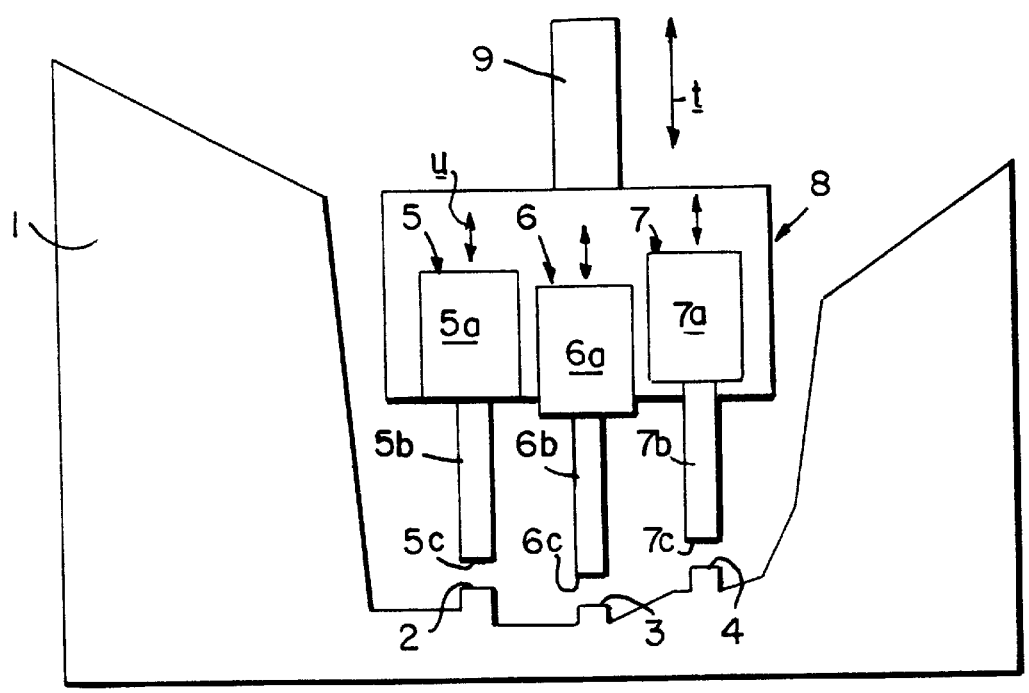
FIGS. 1 and 2 are views each schematically showing a front view of the treatment principle of the inventive device.

A schematic view of the general construction of a device in accordance with the present invention is shown in FIG. 1. A workpiece 1 is provided on its outer surface with a plurality of treatment spots 2, 3 and 4 formed as welding or riveting domes and the like and ending at different height levels. In the prior art, in order to treat such a workpiece it was necessary to provide either a joint sonotrode with differently long daughter horns which compensate the height offset of the treatment spots 2,3,4 or to provide three different, individually designed resonant units and the displacement units coupled with them. Frequently this was not possible due to vibration-technical reasons for the first solution and due to space reasons for the second solution, especially in the case of the treatment spots 2,3,4 which closely follow one another.

In contrast, in the device in accordance with the present invention, three resonant units 5, 6, 7 are utilized, and they are mounted on a single, joint mounting body 8. The mounting body 8 is coupled in turn with a single, joint displacement unit 9. Each resonant unit 5, 6, 7 is composed in a known manner of a convertor 5A, 6A, 7A which as a rule is formed as a piezo-electric vibration generator, and a sonotrode 5B, 6B, 7B which is connected with it. The lower side of each sonotrode has an treatment surface 5C, 6C, 7C which faces the treatment spots 2,3,4. A booster can be connected between the convertor 5A, 6A, 7A and the sonotrode 5B, 6B, 7B.

The resonant units 5,6,7 in accordance with the present invention are mounted on the mounting body 8 in an arrangement which is dependent on the position of the dome-shaped treatment spots 2,3,4. This means that they are arranged on the mounting body 8 with a vertical displacement which corresponds to the vertical displacement of the upper surfaces of the treatment spots 2,3,4 and have the same lateral distances as the treatment spots. When the mounting body 8 during the operation is moved by the displacement unit 9 in direction of a double arrow t parallel to the axes of the treatment spots or domes 2,3,4 in direction of the workpiece 1, then all treatment surfaces 5C, 6C, 7C act substantially simultaneously and vertically from above onto an associated treatment spot 2,3,4. Thereby uniform treatment results are obtained, and a lateral pressing-away of the treatment spots 2,3,4 is prevented.

In an especially preferable embodiment of the present invention, the resonant units 5,6,7 are mounted on the mounting body 8 adjustably relative to one another. This is true in particular for the direction which is parallel to the direction t of the displacement movement, as indicated by a further double arrow u. The individual resonant units 5,6,7 can be individually adjusted in direction of height, to provide an adjustment of the height offset between the individual treatment surface 5C, 6C, 7C corresponding to the treatment spots 2,3,4. If the same device is used at another time for treatment of the workpiece, in which the treatment spots 2,3,4 end at different height levels, then as shown in FIG. 1 the resonant units 5–7 must be displaced only correspondingly in direction of the arrow u. In other aspects, the resonant units 5–7 are mounted on the mounting body 8 adjustably not only in direction of the arrow u but also in other directions, in particular transversely to it. Thereby, also for example their relative lateral distances can be changed.

Figure 2:
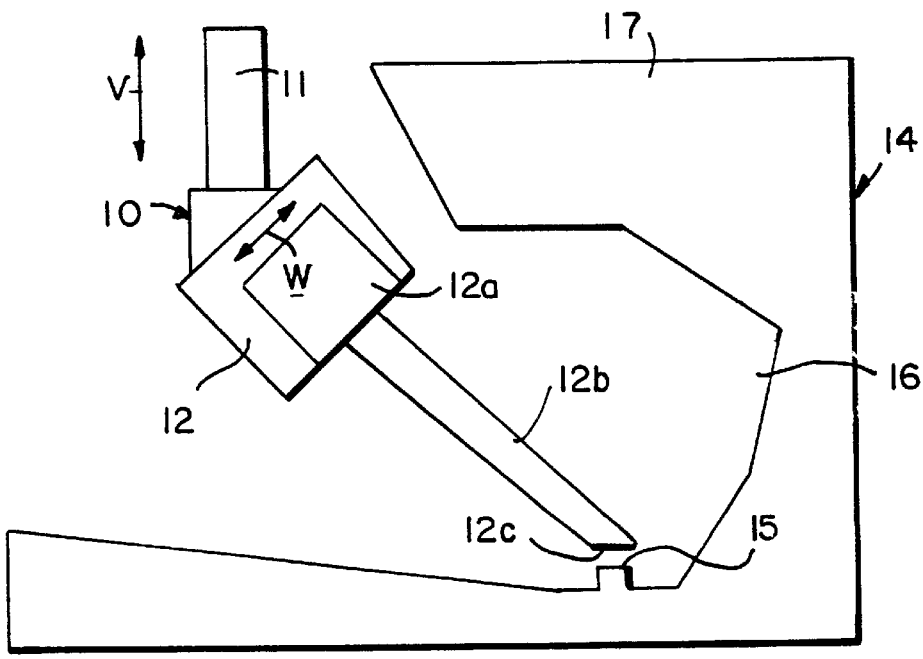

In the embodiment of FIG. 1, all convertors 5A, 6A, 7A are arranged with their axes parallel to the direction of the displacement movement identified with the arrow t. In contrast, in FIG. 2 there is a variant of the device, in which on a mounting body 10 which can be displaced by a displacement unit 11 in direction of a double arrow v, a resonant unit 12 is mounted and has a convertor 12A with an which is inclined to the displacement direction and a correspondingly inclined sonotrode 12B. In order to provide the operation of this variant such that the treatment spot 15 formed on a workpiece 14 is subjected to the action which is parallel to its axis defined by a dome, treatment surface 12C of the sonotrode 12B is arranged perpendicular to the displacement direction identified with arrow v.

For mounting of the resonant unit 12 on the mounting body 10, it is preferably provided with means which make possible an individual adaptation of the height or side position of the resonant unit 12. For this purpose the resonant unit 12 is supported for example perpendicular to the axis of the convertor 12a, or in other words in direction of a double arrow w displaceably on the mounting body 10. The variant in accordance with FIG. 2 has also the advantage that the treatment surface 12C of the sonotrode 12B or a daughter horn mounted on it can extend in a hardly accessible shaped opening 16 of the workpiece 14 which is covered by a workpiece part 17. This makes impossible a treatment of the treatment spot 15 in an arrangement with the resonant unit of FIG. 1.

Figure 3:
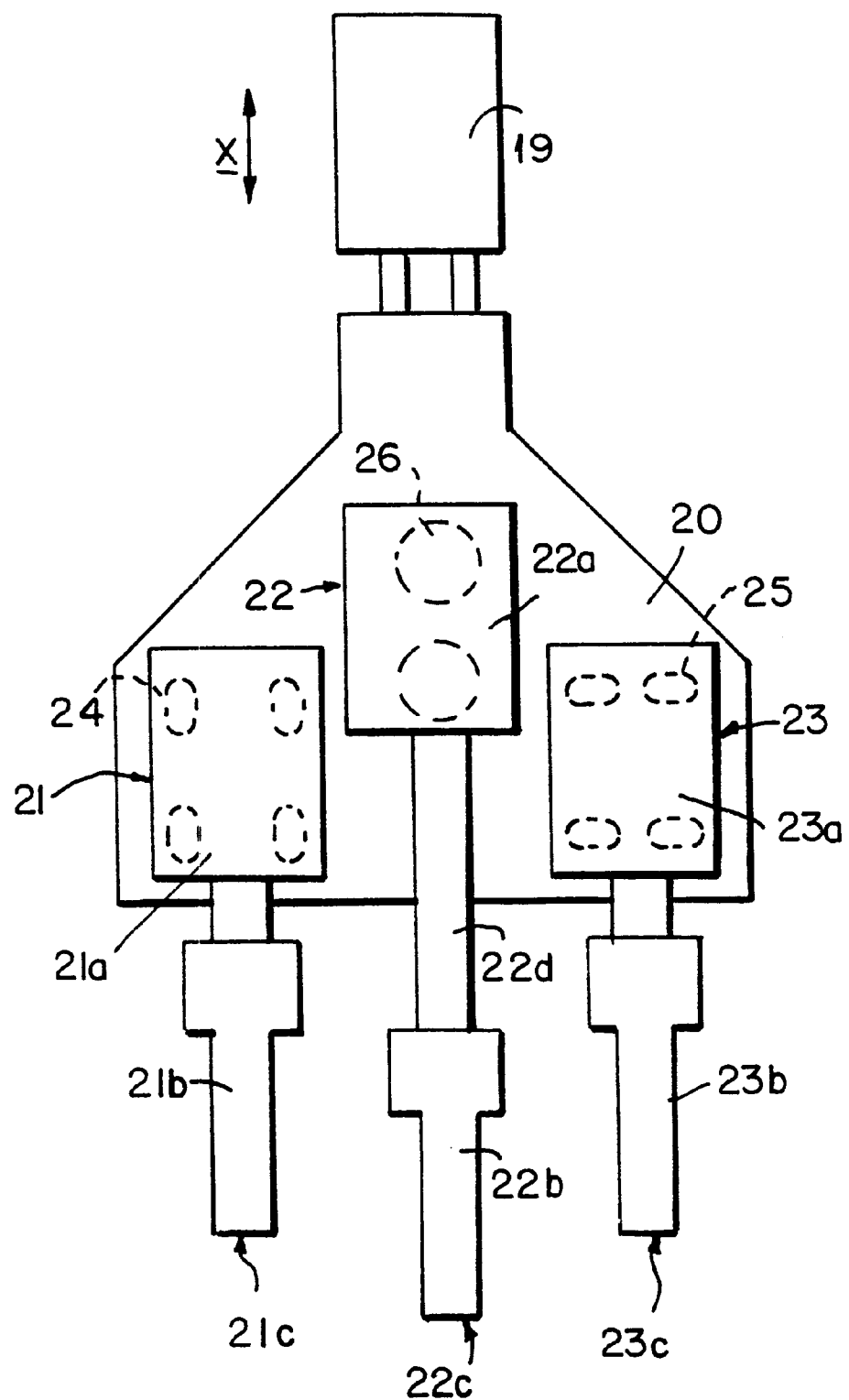
FIGS. 3–5 show a front or a side view of three embodiments of the inventive device.

The embodiment of FIG. 3 includes a displacement unit 19 which is mounted on a mounting body 20 analogously to FIG. 1 and supports the resonant units 21, 22, 23 arranged at relatively great lateral distances. While the resonant units 21, 23 are arranged substantially identically and mounted at the same height on the mounting body 20, the resonant unit 22 is mounted on a point of the mounting body 20 which is located higher. Simultaneously, a sonotrode 22B is connected with its convertor 22A by means of an extended portion 22D, so that its treatment surface 22C is deeper than the treatment surfaces 21C, 23C of the other resonant units 21, 23. Moreover, as shown in broken lines, the mounting of the resonant units 21, 23 can be performed for example so that the mounting body 20 is provided with elongated holes 24, 25 which have longitudinal axes extending parallel or transversely to the displacement direction of the double arrow x, and with mounting screws which pass through the holes 24, 25 and are screwed into the resonant units 21, 23. In contrast, for the mounting of the resonant unit 22, a circular screw hole 26 is provided and for example has a greater diameter than the diameters of the mounting screws extending through it. Therefore the resonant unit 22 can be individually adjusted in any of the four directions. Washers or other elements which are required for supporting the screw heads, and also nuts and the like screwed on them are not shown.

Figure 4:
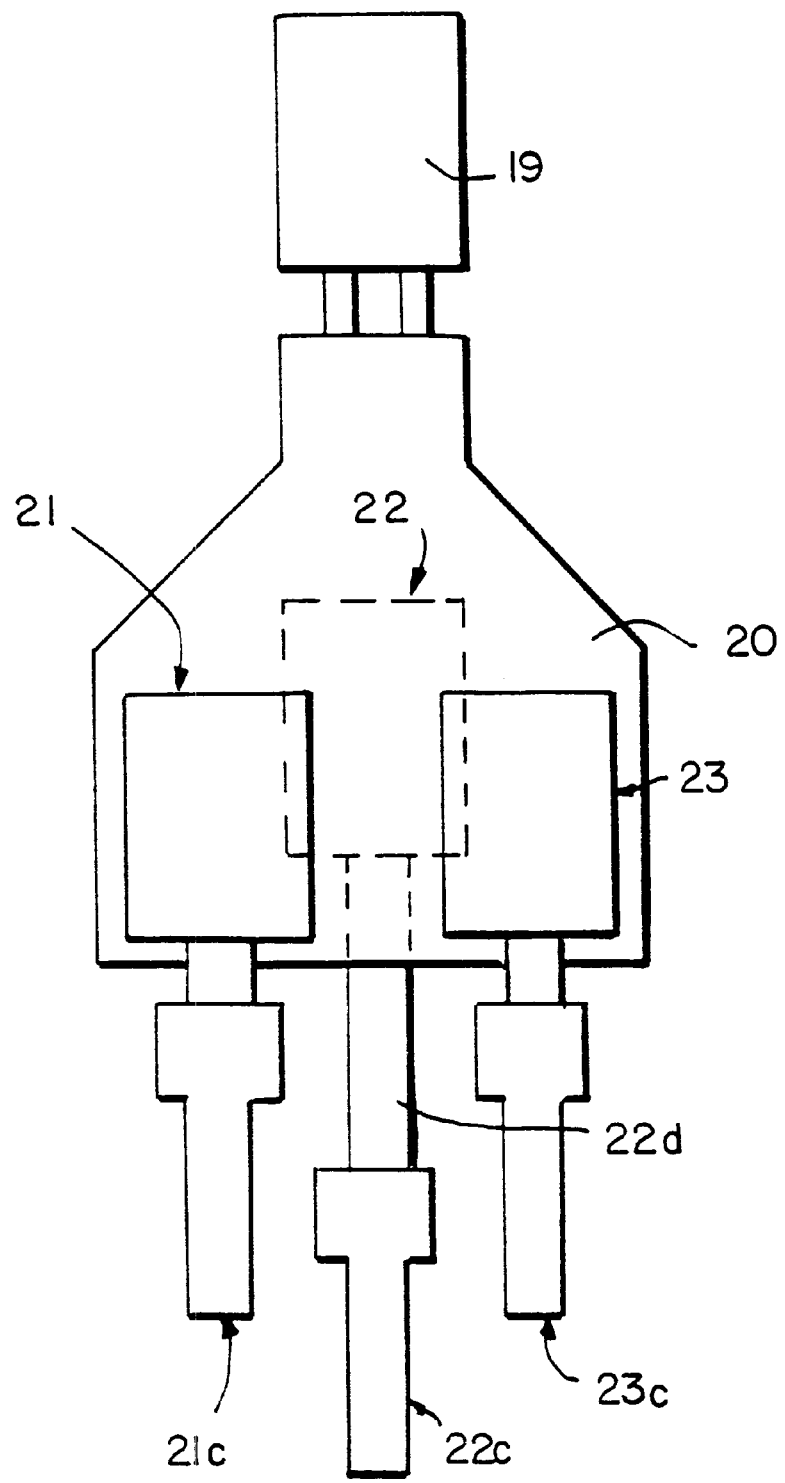

FIG. 4 shows an embodiment which substantially corresponds to FIG. 3, with the same parts identified by the same reference numerals. A difference in this embodiment resides in the fact that the resonant units 21, 23 are arranged on the front side of a mounting body 20, while the resonant unit 22 is mounted on its rear side. Thereby it is possible to arrange the resonant units 21–23 with substantially smaller lateral distances when needed, than in the embodiment of FIG. 3.

Figure 5:
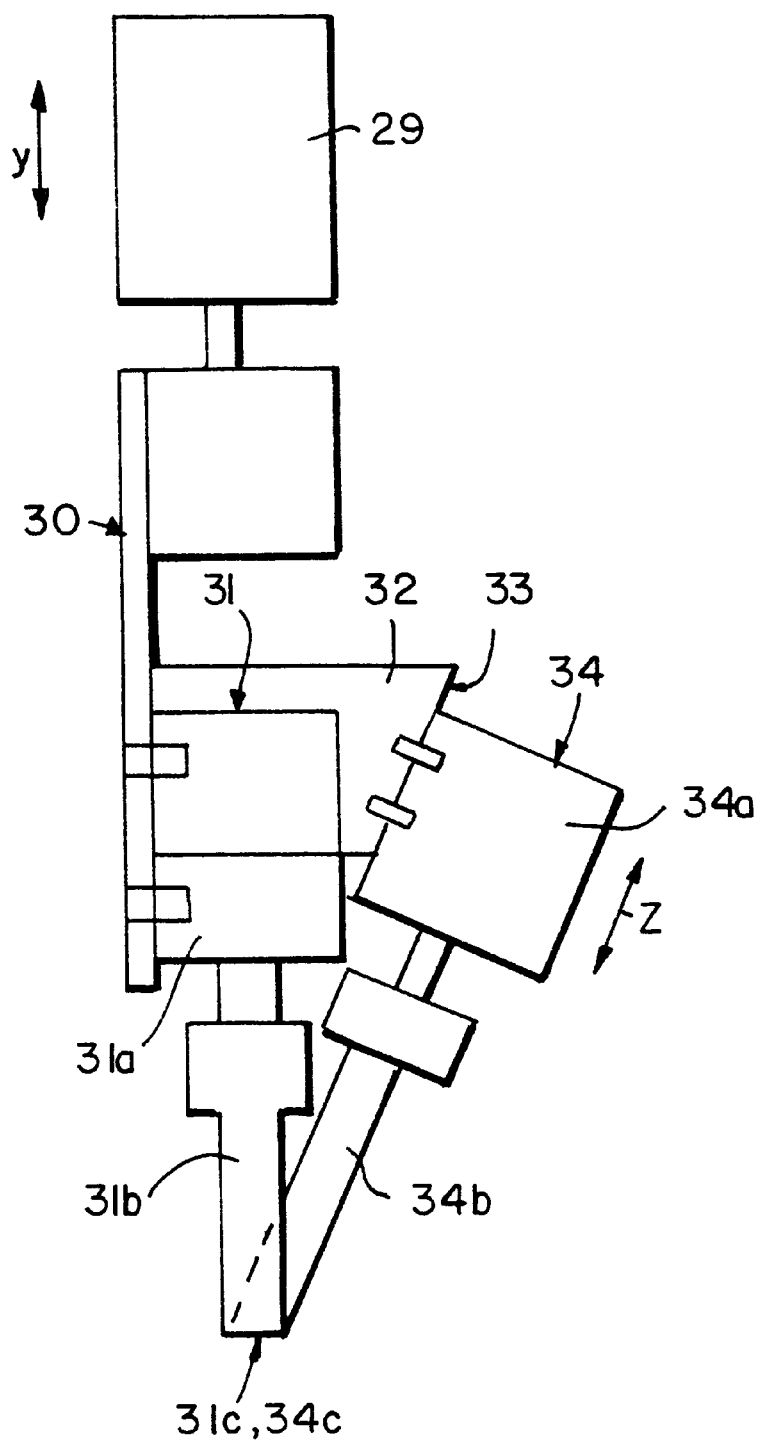

The embodiment of FIG. 5 shows on a side view a displacement unit 29 which supports a mounting body 30 with a resonant unit 31 which is adjustably mounted on the mounting body similarly to FIG. 3. At the point of FIG. 5 located behind the resonant unit 31, an adaptor plate 32 is mounted on the mounting body 30 and has a mounting surface 33 which is inclined to the direction of the displacement movement in accordance with the double arrow y. A resonant unit 34 is displaceably and adjustably mounted on it. Analogously to FIG. 2, it bas a convertor 34A with an axis which is inclined relative to the displacement direction, and a mounting surface 33 which call be displaced or adjusted parallel (double arrow z) and transversely to it along the mounting surface 33. In this embodiment the resonant units 31, 34 are adjusted so that their sonotrodes 31B, 34B are provided with the treatment surfaces 31C, 34C located at the same height level. In other aspects, it is to be understood that the adaptor plate 32 can be mounted adjustably on the mounting body 30.

Figure 8:
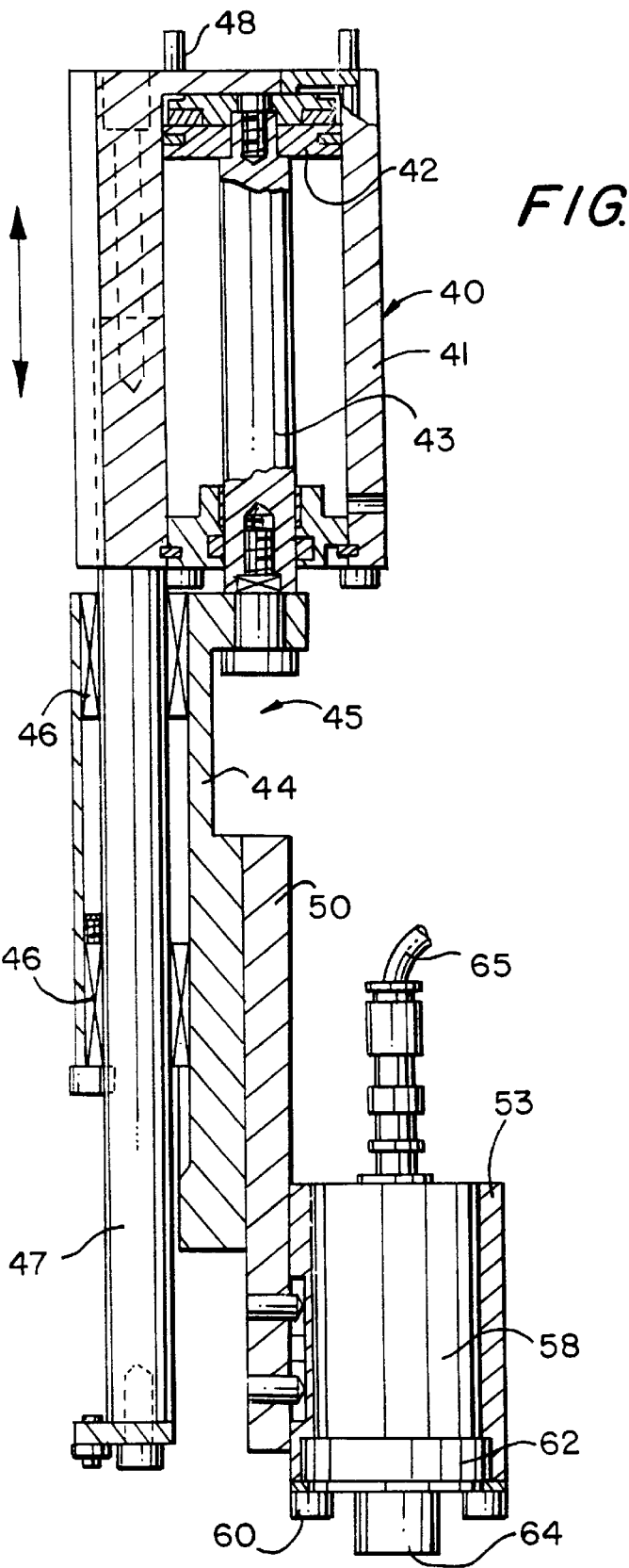

FIGS. 6–8 finally show an embodiment of the inventive device which can be realized with simple means. A displacement unit 40 contains here a pneumatic cylinder 41 with a piston 42 which is reciprocating in the cylinder, and a piston rod 43 mounted on the piston. A guiding part 44 of a mounting body 45 is mounted on an end of the piston rod 43 which extends outwardly beyond the pneumatic cylinder 41. The guiding part 44 is provided at its rear side with two parallel cylindrical passages, which sit with bearings 46 coaxially on two parallel, cylindrical guiding rods 47 and are guided on them indirection of a double arrow. The guiding rods 47 are mounted on the lower side of pneumatic cylinder 42, which in turn can be mounted by threaded pins 48 on a stationary part of the machine frame or the like.

A mounting plate 50 is mounted on the guiding part 44 by screws 49. Two convertor holders 52, 53 are mounted on the mounting plate by mounting screws 51. As can be seen in particular from FIG. 6, the mounting plate 50 at the location where the convertor holder 52 is mounted, is provided with longitudinal holes 54 with longitudinal axes extending transversely to the displacement direction of the mounting body 45. In contrast, for mounting of the convertor holder 53, the elongated holes 55 have longitudinal axes extending parallel to the displacement direction of the mounting body 45. Thereby both convertor holders 52, 53 can be adjusted on the mounting plate 50 relative to one another, both in a vertical direction and in a side direction. Therefore, the height and side adjustment of the sonotrodes or their treatment surfaces, which are shown in FIGS. 1–5 and not shown in FIGS. 6–8, can be provided. The threaded openings provided in the convertor holders 52, 53 for receipt of the mounting screws 51 are shown in FIG. 6 and identified with reference numerals 56.

The convertor holders 52, 53 serve for mounting of the associated resonant units on the mounting body 45. In FIGS. 6–8 only one convertor 57, 58 is shown. It is located in a receiving opening of the associated convertor holder 52, 53 and is fixed in it by a ring-shaped holding part 61, 62 mounted by screws 59, 60 on the convertor holder 52, 53. At the lower end, each convertor 57, 58 has a connecting element 63, 64 for a sonotrode, extending outwardly beyond the mounting part 61, 62.

During operation of the device of FIGS. 6–8 the convertors 57, 58 supply current through schematically shown conductors 65. The pneumatic cylinder 51 is controlled through pressure air conduit 66, 67 to activate the required upward and downward movement of the mounting body 45.

The present invention provides for numerous advantages. Because of the possibility of orientation of the convertor in at least two directions, the required adaptation to a workpiece contour is performed mainly on situ, and replacement or change of the sonotrode can be as a rule dispensed with. Since the convertors are located on a joint displacement unit, therefore in narrow place conditions any treatment problem can be resolved. With the use of additional adaptor plates which are formed for example wedge-shaped and mounted in the embodiment of FIGS. 6–8 additionally on the mounting plate 50, treatment spots which are arranged inclinedly outside the displacement direction are accessible. Therefore, it is not necessary to provide either several displacement units which are operative in various directions, working cycles performed one after the other. The number of the sonotrodes mounted on each mounting plate 50 depends substantially on individual case. The drawings show that for many treatment objectives, identical convertors and as a rule substantially identical sonotrodes can be utilized, that substantially reduces maintenance, storage and service expenses. Since finally without specifically shaped sonotrodes, an individual adaptation to the treatment spots located at different heights is possible, the sonotrodes and the convertors have a substantially greater service life than in the case in which the sonotrodes are provided with treatment surfaces of different heights.

The present invention is not limited to the above described embodiments which can be modified in a simple manner. In particular, the described adjustment means for the sonotrodes on the mounting bodies are only exemplary, and they can be implemented in a different way. Furthermore it is possible to provide the mounting body with more than two or three sonotrodes shown in the drawings. Moreover, each mounting body can be provided, in correspondence with the requirements of the individual cases, specifically with identically or differently formed resonant units in correspondence with the treatment contour of the corresponding workpiece. It is believed to be clear that the described device as a rule is only a part of a general arrangement, in which for a special welding or riveting problems and the like, a plurality of devices of the above mentioned type can be mounted, or additional devices known from the prior art can be combined. Finally, it is believed to be understood that the inventive features can be used in another not shown combination.

It will be understood that each of the elements described above, or two or more together, may also find a useful application in other types of constructions differing from the types described above.

While the invention has been illustrated and described as embodied in device for ultrasonic treatment of workpiece, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for ultrasonic treatment of a workpiece which has at least two treatment spots, comprising at least two resonant units which are adapted to be associated with corresponding ones of said treatment spots, each of said resonant units having a convertor and a sonotrode connected with said convertor; a joint mounting body arranged so that said resonant units are mounted on said joint mounting body in an arrangement which is dependent on a position of the treatment spots on the workpiece; and displacement means composed of a displacement unit which is common for said resonant units and is coupled with said mounting body.

2. A device as defined in claim 1; and further comprising means for adjusting relative position of said resonant units on said mounting body.

3. A device as defined in claim 2, wherein said means for adjusting include screw holes and mounting screws, said screw holes having an inner cross-section with at least one dimension greater than diameters of said mounting screws.

4. A device as defined in claim 3, wherein said screw holes are formed as elongated holes.

5. A device as defined in claim 4, wherein said resonant units are associated with said elongated holes with longitudinal axes extending in different directions.

6. A device as defined in claim 1, wherein said mounting body has a guiding part which is guided displaceably on said displacing means and has a mounting plate which is fixed with said guiding part and provided for mounting of said resonant units.

7. A device as defined in claim 6; and further comprising guiding bars on which said guiding part is slidingly guided, said guiding bars being connected with a part of said displacing means provided for a stationary mounting.

8. A device as defined in claim 3; and further comprising convertor holders in which said convertors are mounted and which are provided with a mounting plate having screw holes, said convertor holders having threaded openings for receiving mounting screws which pass through said screw holes.

9. A device as defined in claim 1, wherein said resonant units are mounted in said mounting body so that axes of their convertors are located parallel to a displacement direction produced by said displacement unit.

10. A device as defined in claim 1, wherein at least one of said resonant units is mounted on said mounting body so that an axis of its convertor is inclined to a direction of a displacement movement produced by said displacement unit.

11. A device as defined in claim 10, wherein said sonotrode which is connected with said convertor having said inclined axis has a treatment surface extending perpendicular to a direction of said displacement movement.

12. A device as defined in claim 10; and further comprising an adaptor plate arranged so that said resonant unit with said convertor having said inclined axis is mounted by said adaptor plate on said mounting body, said adaptor plate having a mounting surface arranged inclinedly to a direction of a displacement movement.

* * * * *